United States Patent Office 3,192,208
Patented June 29, 1965

3,192,208
NOVEL SUBSTITUTED MORPHOLINES AND PIPERAZINES AND PROCESSES FOR THEIR SYNTHESIS
Nelson R. Easton and Robert D. Dillard, Indianapolis, Ind., assignors to Eli Lilly and Company, Indianapolis, Ind., a corporation of Indiana
No Drawing. Filed July 31, 1962, Ser. No. 213,614
2 Claims. (Cl. 260—247)

This invention relates to certain novel processes for synthesizing compounds containing a morpholine or a piperazine ring and to the novel morpholine and piperazine compounds produced thereby.

Heretofore cyclization of an acetylene which has a hydroxyethylamino group attached to a carbon atom alpha to the acetylenic group has yielded an oxazolidine; i.e., compounds containing a 5-membered heterocyclic ring system. It is an object of this invention to provide a process for cyclizing an $\alpha$-aminoacetylene in which the amine function is substituted with a $\beta$-hydroxy hydrocarbon chain or a $\beta$-amino hydrocarbon chain to yield a 6-membered ring system, specifically a morpholine or a piperazine.

The process provided by this invention comprises the cyclization of a hindered aminoacetylene having the amine group attached to a tertiary carbon atom immediately adjacent the acetylene bond, to yield either a methylenemorpholine or a methylenepiperazine. This process is outlined in the following reaction scheme.

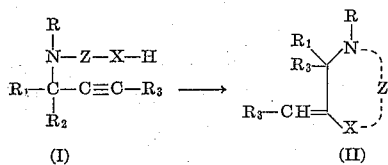

wherein R can be hydrogen, $C_1$–$C_{12}$ alkyl, $C_2$–$C_{12}$ alkenyl, cycloalkyl, cycloalkenyl, an aromatic radical, a substituted aromatic radical, aralkyl, hydroxyalkyl, or alkoxyalkyl; $R_1$ and $R_2$ when taken separately, can be $C_1$–$C_{12}$ alkyl, $C_2$–$C_{12}$ alkenyl, cycloalkyl, cycloalkenyl, alkoxyalkyl, an aromatic radical or a substituted aromatic radical; $R_1$ and $R_2$, when taken together with the carbon atom to which they are attached, represent polycyclic aromatic, partially-hydrogenated polycyclic aromatic, cycloalkyl, or cycloalkenyl; $R_3$ is either hydrogen or halogen, Z is a two-carbon linking group selected from the group consisting of:

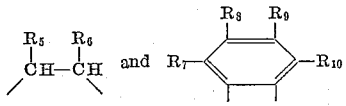

wherein $R_5$ and $R_6$, when taken separately, represent hydrogen, $C_1$–$C_{12}$ alkyl, $C_2$–$C_{12}$ alkenyl, an aromatic radical, a substituted aromatic radical, cycloalkyl, cycloalkenyl, aminoalkyl, lower-alkyl-aminoalkyl, di-lower-alkylaminoalkyl, hydroxyalkyl, aralkyl, or alkoxyalkyl; $R_5$ and $R_6$, when taken together with the carbon atoms to which they are attached, represent cycloalkyl and cycloalkenyl; and $R_7$, $R_8$, $R_9$, and $R_{10}$ represent the same or different members of the group consisting of hydrogen, halogen, lower alkoxy, lower alkyl, lower-alkylamino, di-lower-alkylamino, acylamino, hydroxy, and halogen-substituted lower alkyl; and X represents either —O— or

According to the above reaction scheme, an aminoacetylene represented by the Formula I is cyclized by the action of base in an inert solvent or dispersing medium to yield a methylenemorpholine or methylenepiperazine having structure II. These methylenemorpholines and methylenepiperazines are useful intermediates in that they can be hydrogenated to yield a morpholine or piperazine of the following formula:

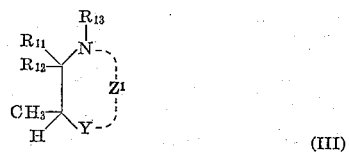

wherein $R_{13}$ represents hydrogen, $C_1$–$C_{12}$ alkyl, cycloalkyl, an aromatic radical, a substituted aromatic radical, aralkyl, hydroxyalkyl, or alkoxyalkyl, $R_{11}$ and $R_{12}$, when taken separately, each represent a member of the group consisting of $C_1$–$C_{12}$ alkyl, alkoxyalkyl, cycloalkyl, aromatic radicals, and substituted aromatic radicals, $R_{11}$ and $R_{12}$, when taken together with the carbon atom to which they are attached, represent a member of the group consisting of polycyclic aromatic radicals, partially-hydrogenated polycyclic aromatic radicals, and cycloalkyl; and $Z^1$ is a two-carbon linking group selected from the group consisting of:

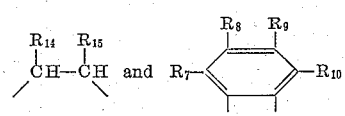

wherein $R_{14}$ and $R_{15}$, when taken separately, can be hydrogen, $C_1$–$C_{12}$ alkyl, an aromatic radical, a substituted aromatic radical, cycloalkyl, aminoalkyl, lower-alkyl-aminoalkyl, di-lower-alkylaminoalkyl, aralkyl, hydroxyalkyl, and alkoxyalkyl, $R_{14}$ and $R_{15}$, when taken together with the carbon atoms to which they are attached, represent a cycloalkyl group; $R_7$, $R_8$, $R_9$, and $R_{10}$ have the same significance as hereinabove; and Y represents either —O— or

In Formulas I–III above, when R, $R_1$, $R_2$, $R_5$, $R_6$, $R_{11}$, $R_{12}$, $R_{13}$, $R_{14}$ and $R_{15}$ represent alkyl radicals having 1–12 carbon atoms, they can be, illustratively, methyl, ethyl, isopropyl, n-butyl, sec-butyl, n-amyl, t-amyl, 3-methylpentyl, 2-ethylhexyl, n-decyl, 6-ethyldecyl, neopentyl, and the like. When R, $R_1$, $R_2$, $R_5$, and $R_6$ represent alkenyl radicals having from 2–12 carbon atoms, they can be, illustratively, allyl, methallyl, crotyl, 2-pentenyl, 1-methyl-3-hexenyl, 3-ethyl-1-decenyl, undecenyl, isooctenyl and the like. When R, $R_1$, $R_2$, $R_5$, $R_6$, $R_{11}$, $R_{12}$, $R_{13}$, $R_{14}$, and $R_{15}$ represent aromatic radicals, they can be any of the ring systems fulfilling the usual criteria for aromaticity. Examples of such aromatic ring systems are, illustratively, phenyl, naphthyl, thienyl, furyl, pyridyl, pyrimidyl and the like. Permissible substituents in these aromatic rings include halogens such as chlorine, bromine, and fluorine; $C_1$–$C_5$ alkyl groups such as methyl, ethyl, isopropyl, sec-butyl, t-butyl, n-amyl, isoamyl, etc.; perhaloalkyl, amino, alkylamino, dialkylamino, acylamino; and alkoxy such as methoxy, ethoxy, propoxy, isopropoxy, n-butoxy and the like. The alkyl substituent in the alkylamino and dialkylamino substituting groups can be the same or different radicals such as methyl, ethyl, n-propyl, isobutyl, sec-butyl, n-amyl and the like. When the amino group is substituted with an acyl group, these acyl groups can be, illustratively, aliphatic acyl radicals such as acetyl, propionyl, acrylyl, caproyl and the like; aroyl radicals such as benzoyl, chlorobenzoyl, ethyl-benzoyl, furoyl, thenoyl, nicotinoyl, and the like; or aryl-substituted aliphatic acyl radicals such as phenylacetyl, 3-phenylpropionyl, methoxyphenylacetyl, and the like. Illustrative aromatic or substituted aromatic radicals which R, $R_1$, $R_2$, $R_5$, $R_6$, $R_{11}$, $R_{12}$, $R_{13}$, $R_{14}$, and $R_{15}$ can represent thus include naphthyl, phenyl, β-fluoronaphthyl, 2-chlorophenyl, 2-hydroxyfuryl, 2-dimethylaminopyridyl, 3-(2-methylbutyl)pyridyl, o-, m-, and p-bromothienyl, tolyl, o-isoamylphenyl, m-xylyl, p-iodophenyl, trifluoromethylphenyl, pentafluoroethylphenyl, trichloromethylphenyl, p-(n-hexyl)phenyl, p-ethoxyphenyl, p-dimethylaminophenyl, 2-isopropylpyridyl, fluorophenanthryl, nitrothienyl, 3-methylfuryl, anisyl, etc.

In the above formulas, when R, $R_1$, $R_2$, $R_5$, $R_6$, $R_{11}$, $R_{12}$, $R_{13}$, $R_{14}$, and $R_{15}$ represent cycloalkyl radicals, they can be, illustratively, cyclobutyl, cyclopentyl, cyclohexyl, cycloheptyl, cyclo-octyl, methylcyclopentyl, ethylcyclohexyl, and the like. When R, $R_1$, $R_2$, $R_5$, and $R_6$ represent cycloalkenyl radicals, they can be, illustratively, cyclobutenyl, cyclopentenyl, 3-butylcyclohexenyl, cycloheptenyl, cyclo-octenyl and the like. $R_1$ and $R_2$, or $R_{11}$ and $R_{12}$, when taken together with the carbon atom to which they are attached, represent polycyclic aromatic or cycloalkyl, illustratively, tetralinyl, indanyl, cyclohexyl, fluorenyl, cyclopentyl, cyclobutyl, dihydroanthranyl, thioxanthyl, xanthyl, dibenzocycloheptadienyl or dibenzocycloheptatrienyl, cycloheptyl, and the like. $R_5$ and $R_6$, or $R_{14}$ and $R_{15}$, when taken together with the carbon atoms to which they are attached, can form a cycloalkyl ring, such rings including cyclobutyl, cyclopentyl, cyclohexyl, cycloheptyl, cyclo-octyl, and the like. $R_1$ and $R_2$, or $R_5$ and $R_6$, when taken together with the carbon atoms to which they are attached, additionally can represent a cycloalkenyl ring system such as cyclobutenyl, cyclopentenyl, cyclohexenyl, cycloheptenyl, cyclo-octenyl, including any of these rings with alkyl substituents. R, $R_5$, $R_6$, $R_{13}$, $R_{14}$, and $R_{15}$ can also represent an aralkyl radical such as, illustratively, benzyl, phenethyl, 2-phenylpropyl, 1-phenylethyl, 1-tolylethyl, m-chlorobenzyl and the like, the permissible aryl radicals substituted in the alkyl chain being, in general, those defined above for R, $R_1$, $R_2$, $R_5$, $R_6$, $R_{11}$, $R_{12}$, $R_{13}$, $R_{14}$, and $R_{15}$. Halogens which $R_3$ can represent include chlorine, fluorine, iodine, and bromine. When R, $R_1$, $R_2$, $R_5$, $R_6$, $R_{11}$, $R_{12}$, $R_{13}$, $R_{14}$, and $R_{15}$ represent alkoxyalkyl radicals they can be illustratively 12-methoxydodecyl, methoxypropyl, ethoxyethyl, isopropoxyamyl and the like. $R_5$, $R_6$, $R_{14}$, and $R_{15}$, when they represent aminoalkyl, lower-alkylaminoalkyl, di-lower alkylaminoalkyl, can be illustratively 2-(dimethylamino)ethyl, 3-(ethylamino)propyl, 2-(ethylamino)propyl, methylaminomethyl, dimethylaminoethyl, and the like.

In the above formulas, the two-carbon linking groups, symbolized by the terms Z or $Z^1$, can be either a two-carbon alkyl (ethylene) group optionally substituted on either carbon or a two-carbon linking group which forms part of an aromatic ring. The grouping "—X—H" wherein X is an oxygen,

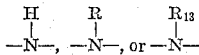

is attached directly to the Z or $Z^1$ moiety. Illustrative groups for Z—X—H and $Z^1$—X—H include 2-hydroxyethyl, 2-amino-ethyl, o-aminophenyl, o-methylaminophenyl, 2-hydroxy-1-methylethyl, 2-hydroxyphenyl, 2-hydroxybutyl, 2-hydroxy-2-phenylethyl, and the like. The various substituting groups $R_5$, $R_6$, $R_7$, $R_8$, $R_9$, $R_{10}$, $R_{14}$, and $R_{15}$ specified above as substituents can, of course, also be present in any of the above two-carbon linking groups.

The reaction whereby an acetylenic amine represented by Formula I is cyclized to yield a methylenemorpholine or methylenepiperazine represented by Formula II is accomplished by heating the acetylenic amine under anhydrous conditions in the presence of a base in an inert solvent or dispersing medium. The base can be present as a second phase, as for example when solid potassium or sodium hydroxide is used in an aromatic hydrocarbon dispersing medium such as toluene. Alternatively, a homogenous reaction can be carried out in which the base is actually in solution. In this instance, a strong organic base such as piperazine, collidine, or triethylamine is conveniently employed. The basic catalyst can also be present in the form of basic amino group in the aminoacetylene molecule itself. For example, when X in Formula I is an amino group; i.e.,

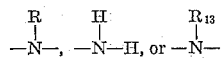

this amino group may be sufficiently basic to catalyze the ring closure without the necessity of adding a second basic substance.

In the above cyclization reaction, we prefer to employ an aromatic hydrocarbon solvent as the next dispersing medium, although other inert anhydrous solvents such as the ethers of ethylene and propylene glycols are equally operative. It is most convenient to carry out the reaction at the reflux temperature of the solvent and the choice of solvent depends upon the rate of the cyclization reaction at the reflux temperature of the solvent. Ordinarily, toluene is employed for the preparation of the methylenemorpholine and methylenepiperazine compounds of this invention, since the speed of the ring closure reaction is sufficiently rapid at the boiling point of this solvent for a majority of reactants.

As previously stated, the methylenemorpholines and methylenepiperazines of Formula II are useful intermediates in that they can be catalytically hydrogenated to yield saturated compounds having the structure of Formula III. The hydrogenation reaction whereby the methylenic group in Formula II is hydrogenated to a methyl group is conveniently accomplished in the presence of one of the standard heavy metal hydrogenation catalysts including platinum, palladium, rhodium and the like. We prefer to employ a palladium catalyst such as 5 percent palladium-on-carbon, since it be not quite as active as catalyst as some others available, and hence is less likely to cause a reductive cleavage of the morpholine or piperazine ring. The reaction conditions of the hydrogenation reaction are those which have been employed in similar reactions in the prior art and include the use of a low pressure hydrogenation apparatus, a hydrogen pressure varying from 25–75 p.s.i., ambient room temperature, and a polar solvent such as ethanol. This latter type of solvent is particularly desirable when an acid addition salt of a morpholine or piperazine is hydrogenated instead of the free base. During the hydrogenation reaction, any ethylenic unsaturation present in the morpholine or piperazine molecule, in addition to the aforementioned methylenic group, will also be catalytically hydrogenated to yield a saturated grouping. When non-acidic reaction conditions are employed, only the ethylenic unsaturations will be reduced under ordinary low pressure and low temperature reaction conditions. However, in a solvent such as acetic acid, hydrogenation catalysts, in particular, platinum are greatly activated and are capable of reducing a benzene ring to yield the corresponding cyclohexane derivative. Use of higher temperatures, as for example 70° C., in conjunction with a non-acidic reaction medium will accomplish the same result. The catalytic hydrogenation reaction can therefore be tailor-made to reduce benzenoid unsaturations or to leave them untouched, as is well known in the art. (See, for example, Gilman, Organic Chemistry, Second Edition, John Wiley and Sons, Inc., New York, volume 1, chapter 9.)

The catalytic hydrogenation reaction conditions which will reduce an ethylenic double bond will also reduce other groupings in the molecule, as for example nitro groups, nitroso groups, carbonyl groups, nitriles, and the like. Furthermore, the halogen of the halomethyl group in Formula II above (where $R_3$ is halo) is removed during a low pressure catalytic hydrogenation, thus yielding a methyl group.

Other hydrogenation procedures can also be employed to reduce the exocyclic double bond, such procedures including the use of di-imide, sodium and ethanol, lithium aluminum hydride, and other equivalent materials.

The compounds of this invention are heavy viscous oils or low melting solids. The compounds readily form acid addition salts and these acid addition salts are, in general, white crystalline solids. These acid addition salts are included within the scope of this invention and are useful not only in isolating the amine bases provided by this invention, but also in formulating these amine bases for other uses. The preparation of these acid addition salts can be carried out as follows: A solution of the amine base is mixed with an equivalent of an acid or with a solution containing an equivalent of the acid. If the acid addition salt thus formed is insoluble in the solvent employed, the salt is isolated by filtration or centrifugation. On the other hand, if the acid addition salt is soluble in the solvent employed, the acid addition salt is isolated by evaporation. When an acid addition salt is formed with a gaseous acid such as hydrogen chloride, an excess of the acid can be employed since the excess can be readily removed by volatilization. The preparation of a typical acid addition salt, specifically a hydrochloride salt, is carried out as follows: A solution of the morepholineyl amine is prepared in anhydrous ether and an ethereal solution of hydrogen chloride is added thereto, the hydrogen chloride being in a quantity in excess of that needed to react with the number of equivalents of amine present. The amine hydrochlorides are, in general, insoluble in the ethereal solution and are separated by filtration. The acid addition salts are satisfactorily purified by recrystallization from a mixture of anhydrous ethanol and ethyl acetate, although other solvents and solvent mixtures are equally operative.

Other acid addition salts including the sulfates, phosphates, nitrates, hydrobromides, hydriodides, succinates, benzoates, acetates, maleates, tartrates, citrates and the like, are prepared by following one of the general procedures outlined above.

The processes of this invention provide a series of morpholines and piperazines which are uniquely substituted in that they possess two alkyl or aryl groups on a carbon atom adjacent to a ring nitrogen atom, a methyl, methylene, or halomethylene substituent on the next adjacent carbon atom as well as optional substitutents on other ring carbon or nitrogen atoms. Such uniquely substituted compounds have not been heretofore preparable by the synthetic processes available in the prior art.

The piperazine and morpholine compounds of this invention, particularly those corresponding to Formula III above either in the form of the free base or as an acid addition salt thereof, manifest central nervous system stimulant action and vasodilator action when administered to standard laboratory animals. In addition, certain of the compounds show a moderate hypotensive effect. The compounds also have demonstrated antibiotic action against animal pathogens and saprophytic bacteria, such as *Sarcina lutea, Mycobacterium tuberculosis, Mycobacterium avium, Proteus vulgaris, Shigella paradysenteriae* and *Vibrio metschnikovii*; against animal pathogens and saprophytic fungi such as *Saccharomyces pastorianus, Trichophyton rubrum* and *Trichophyton interdigitale*; against bacterial plant pathogens, such as *Corynebacterium michiganense, Erwinia amylovora* and *Xanthomonas phaseoli*; and against fungal plant pathogens and material degrading organisms, such as *Alternaria solani, Aspergillus niger, Botrytis cinerea, Ceratostomella ulmi, Colletotrichum pisi, Endoconidiophora fagacearum, Fusarium moniliforme, Glomerella cingulata, Heminothosporium sativium, Penicillium expansum, Phoma pigmentovora, Polyporus ostreatus, Pullularia sp.,* and *Verticillium albo-atrum*. In addition, many of the compounds of this invention have shown insecticidal and neomatocidal activity.

The following examples more fully illustrate the novel processes and compositions of this invention.

EXAMPLE 1

*Preparation of 4-ethyl-2,3,3-trimethylmorpholine*

Fifteen grams of N-ethyl-N-(2-hydroxyethyl)-3-amino-3-methyl-1-butyne were added dropwise to 200 ml. of refluxing toluene containing one gram of potassium hydroxide. After the addition had been completed, the reaction mixture was refluxed for about an additional 90 minutes and was then cooled and filtered. The toluene was removed by evaporation in vacuo, leaving as a residue 4-ethyl-3,3-dimethyl-2-methylenemorpholine formed in the above reaction. The compound boiled in the range 68–69° C. at a pressure of 10 mm. of Hg.

Five and five tenths of 4-ethyl-3,3-dimethyl-2-methylenemorpholine were dissolved in 200 ml. of ethanol. Five tenths gram of palladium-on-charcoal catalyst was added and the mixture was hydrogenated at a pressure of about 40 pounds of hydrogen in a low pressure hydrogenation apparatus until the theoretical quantity of hydrogen had been absorbed. The reaction mixture was filtered to remove the catalyst. The filtrate was made acidic by the addition of ethanolic hydrogen chloride and the solvents were removed by evaporation in vacuo, leaving as a residue 4 - ethyl - 2,3,3 - trimethylmorpholine hydrochloride. The residue was dissolved in water and the resulting acidic aqueous solution was made basic by the addition of 50 percent (w./v.) aqueous sodium hydroxide, thus forming 4-ethyl-2,3,3-trimethylmorpholine free base. The free base, being insoluble in the aqueous alkaline layer, separated as an oil, which was taken up in ether. The ethereal layer was separated and dried; the ether was removed by evaporation in vacuo; and the residue, comprising 4-ethyl-2,3,3-trimethylmorpholine, was purified by distillation. The compound boiled at about 30° C. at a pressure of about 0.1 mm. of Hg.

4-ethyl-2,3,3-trimethylmorpholine was converted to the corresponding hydrochloric salt by dissolving the free base in ethanol and adding an excess of ethanolic hydrogen chloride to the ethanolic solution. Evaporation of the solvents in vacuo yielded 4-ethyl-2,3,3-trimethylmorpholine hydrochloride which melted at about 190–193° C. after recrystallization from ethyl acetate.

*Analysis.*—Calc.: C, 55.80; H, 10.41. Found: C, 55.54; H, 10.12.

EXAMPLE 2

*Preparation of 2,3,3,4-tetramethylmorpholine*

Following the procedure of Example 1, N-methyl-N-(2-hydroxyethyl)-3-amino-3-methyl-1-butyne was heated in the presence of alkali in toluene solution to form 3,3,4-trimethyl-2-methylenemorpholine which distilled in the range 94–96° C. at a pressure of about 70 mm. of Hg. Hydrogenation and purification of the hydrogenated product by the procedure of Example 1 yielded 2,3,3,4-tetramethylmorpholine which distilled in the range 70–72° C. at a pressure of about 25 mm. of Hg; $n_D^{25}=1.450$.

2,3,3,4-tetramethylmorpholine hydrochloride was prepared by the method of Example 1 and melted at about 167–169° C. after recrystallization from a mixture of ethyl acetate and methyl ethyl ketone.

*Analysis.*—Calc.: C, 53.47; H, 10.10. Found: C, 53.65; H, 10.08.

The above procedure was followed in the preparation of the following substituted 2,3,3-trimethylmorpholine.

3-(2-hydroxyethylamino)-3-methyl-1-butyne was cyclized to yield 3,3 - dimethyl - 2 - methylenemorpholine which distilled in the range 30–35° C. at a pressure of about 5 mm. of Hg. Hydrogenation of this compound yielded 2,3,3-trimethylmorpholine which was isolated as the free base. 2,3,3-trimethylmorpholine free base was converted to the hydrochloride salt which melted at about 159–161° C. after recrystallization from ethyl acetate.

N-phenethyl-N-(2-hydroxyethyl)-3-amino-3-methyl-1-butyne was cyclized to yield 4-phenethyl-3,3-dimethyl-2-methylenemorpholine which distilled in the range 85–86° C. at a pressure of about 0.03 mm. of Hg; $n_D^{25}$ =1.526. The compound was hydrogenated to yield 4-phenethyl-2,3,3-trimethylmorpholine, which distilled at about 84° C. at a pressure of about 0.03 mm. of Hg; $n_D^{25}$=1.514. The hydrochloride salt melted at 199–201° C.

*Analysis.*—Calc.: C, 66.77; H, 8.97. Found: C, 66.62; H, 8.99.

N-ethyl-N-(2-hydroxy-3-isopropoxypropyl)-3-amino-3-methyl-1-butyne was cyclized to yield 4-ethyl-3,3-dimethyl-2-methylene-5-isopropoxymethylmorpholine which distilled in the range 55–56° C. at a pressure of about 0.03 mm. of Hg; $n_D^{25}$=1.455. The compound was hydrogenated to yield 4-ethyl-2,3,3-trimethyl-5-isopropoxymethylmorpholine, which distilled at about 50° C. at a pressure of about .01 mm. of Hg; $n_D^{25}$=1.445. The hydrochloride salt melted at 106–108° C.

*Analysis.*—Calc.: C, 58.74; H, 10.62. Found: 58.87; H, 10.67.

N-allyl-N-(2-hydroxyethyl)-3-amino-3-methyl-1-butyne was cyclized to yield 4-allyl-3,3-dimethyl-2-methylenemorpholine, which distilled in the range 56–57° C. at a pressure of about 4 mm. of Hg; $n_D^{25}$=1.477. This compound was hydrogenated to yield 4-propyl-2,3,3-trimethylmorpholine distilling in the range 60–66° C. at a pressure of about 4 mm. of Hg.

N-ethyl-N-(2-hydroxy-3-alloxypropyl)-3-amino-3-methyl-1-butyne was cyclized to yield 4-ethyl-3,3-dimethyl-2-methylene-6-alloxymethylmorpholine which distilled at about 72° C. at a pressure of about 0.05 mm. of Hg; $n_D^{25}$=1.470. The compound was hydrogenated using a palladium-on-carbon catalyst. Both the double bond of the allyl group and the double bond of the methylene group were reduced to give 4-ethyl-2,3,3-trimethyl-6-propoxymethylmorpholine which distilled in the range 62–64° C. at a pressure of about 0.1 mm. of Hg; $n_D^{25}$=1.448. The hydrochloric salt melted at 132–134° C.

*Analysis.*—Calc.: C, 58.74; H, 10.62. Found: C, 59.03; H, 10.73.

N-ethyl-N-(2,3-dihydroxypropyl)-3-amino-3-methyl-1-butyne was cyclized to yield 4-ethyl-3,3-dimethyl-2-methylene-6-hydroxymethylmorpholine which melted at about 97–101° C. after recrystallization from diethyl ether. The compound was hydrogenated to yield 4-ethyl-2,3,3-trimethyl-6-hydroxymethylmorpholine which distilled in the range 57–60° C. at a pressure of about 0.03 mm. of Hg. The distillate crystallized on standing, and the crystals were found to melt at about 55–56° C. The corresponding hydrochloride salt melted at 160–162° C.

N-ethyl-N-(2-hydroxyethyl)-3-amino-3-methyl-1-chloro-1-butyne was cyclized with potassium hydroxide in benzene solution to yield 4-ethyl-3,3-dimethyl-2-chloromethylenemorpholine which distilled in the range 88–90° C. at a pressure of 4 mm. of Hg. Redistillation of this fraction through a spinning band fractionating column yielded purified 4-ethyl-3,3-dimethyl-2-chloromethylenemorpholine distilling at about 88° C. at a pressure of about 4 mm. of Hg; $n_D^{25}$=1.491.

*Analysis.*—Calc.: C, 56.98; H, 8.50. Found: C, 57.07; H, 8.66.

N-ethyl-N-(2-hydroxy-3-dimethylaminopropyl)-3-amino-3-methyl-butyne was cyclized with potassium hydroxide in a refluxing toluene solution to yield 4-ethyl-3,3-dimethyl-2-methylene-6-diethylaminomethylmorpholine distilling in the range 64–66° C. at a pressure of about 0.1 mm. of Hg; $n_D^{25}$=1.467. The compound was hydrogenated to yield 4-ethyl-2,3,3-trimethyl-6-dimethylaminomethylmorpholine distilling in the range 52–53° C. at a pressure of about 0.02 mm. of Hg. The corresponding hydrochloride salt melted at about 94–96° C.

EXAMPLE 3

*Preparation of 4-ethyl 2,3,3,6-tetramethylmorpholine*

Following the procedure of Example 1, N-ethyl-N-(2-hydroxypropyl)-3-amino-3-methyl-1-butyne was heated in the presence of base in toluene solution to yield 4-ethyl-3,3,6-trimethyl-2-methylenemorpholine, which distilled at about 54° C. at a pressure of about 7 mm. of Hg; $n_D$=1.458. The corresponding hydrochloride salt was prepared by the method of Example 1 and melted at 177–179° C. after recrystallization from ethyl acetate.

Following the procedure of Example 1, 4-ethyl-3,3,6-trimethyl-2-methylenemorpholine was hydrogenated to yield 4-ethyl-2,3,3,6-tetramethylmorpholine, which distilled at about 54° C. at a pressure of about 7 mm. of Hg; $n_D^{25}$=1.446. The corresponding hydrochloride salt was prepared by the method of the same example and melted at about 172–174° C. after recrystallization from a mixture of ethyl acetate and methyl ethyl ketone.

*Analysis.*—Calc.: C, 57.81; H, 10.67. Found: C, 58.06; H, 10.69.

Following the above procedure, N-ethyl-N-(2-hydroxy-1-methylethyl)-3-amino-3-ethyl-1-butyne was cyclized to yield 4-ethyl-3,3,5-trimethyl-2-methylenemorpholine, which distilled at about 51° C. at a pressure of about 5 mm. of Hg; $n_D^{25}$=1.464. Hydrogenation of this compound yielded 4-ethyl-2,3,3,5-tetramethylmorpholine which was isolated as the free base. The free base was converted to the hydrochloride salt, which melted at about 180–182° C. after recrystallization from a mixture of ethyl acetate and methyl ethyl ketone.

*Analysis.*—Calc.: C, 57.81; H, 10.67. Found: C, 57.55; H, 10.51.

EXAMPLE 4

*Preparation of 1-methyl-5-ethyl-2-oxa-5-azaspiro[5.5] undecane*

Following the procedure of Example 1, N-(2-hydroxyethyl)-N-ethyl-1-amino-1-ethynylcyclohexane was heated in the presence of alkali in toluene solution to give 1-methylene-5-ethyl-2-oxa-5-azaspiro[5.5]undecane. The compound boiled at 65° C. at a pressure of about 0.3 mm. of Hg; $n_D^{25}$=1.499. The compound was hydrogenated over a palladium-on-charcoal catalyst to yield 1-methyl-5-ethyl-2-oxa-5-azaspiro[5.5]undecane, which distilled at about 56° C. at a pressure of about 0.05 mm. of Hg; $n_D^{25}$=1.484. The hydrochloride salt was prepared by the method of Example 1 and melted at about 168–170° C. after recrystallization from methyl ethyl ketone.

*Analysis.*—Calc.: C, 61.65; H, 10.35. Found: C, 61.99; H, 10.35.

EXAMPLE 5

*Preparation of 4-ethyl-2,3,3-trimethyl-6-phenylmorpholine*

Following the procedure of Example 1, N-ethyl-N-(2-hydroxy-2-phenylethyl)-3-amino-3-methyl-1-butyne was heated in the presence of potassium hydroxide in a refluxing toluene solution to form 4-ethyl-3,3-dimethyl-2-methylene-6-phenylmorpholine, which distilled in the range 94–96° C. at a pressure of about 0.1 mm. of Hg; $n_D^{25}$=1.525.

Still following the procedure of Example 1, 4-ethyl-3,3-dimethyl-2-methylene-6-phenylmorpholine was hydrogenated to yield 4-ethyl-2,3,3-trimethyl-6-phenylmorpholine, which distilled in the range 100–105° C. at a pressure of about 0.08 mm. of Hg; $n_D^{25}$=1.512. The corresponding hydrochloride salt was made by the procedure of the same example and melted at about 194–196° C. after recrystallization from a mixture of methyl ethyl ketone and isopropyl alcohol.

Other morpholines similar to the above compound in structure except for a substituent in the phenyl ring were prepared by the same general procedure.

N - ethyl - N - [2 - hydroxy - 2 - (4 - chloropheynl) ethyl]-3-amino-3-methyl-1-butyne was cyclized to give 4-ethyl - 3,3 - dimethyl - 6 - (4 - chlorophenyl) - 2 - methylenemorpholine, and this compound was hydrogenated to yield 4-ethyl-2,3,3-trimethyl-6-(4-chlorophenyl)morpholine, which distilled in the range 100–103° C. at a pressure of about 0.1 mm. of Hg; $n_D^{25}=1.519$. The hydrochloride salt melted at 164–166° C.

*Analysis.*—Calc.: C, 59.21; H, 7.62. Found: C, 59.17; H, 7.89.

N - ethyl - N - [2 - hydroxy - 2 - (4 - methoxyphenyl) ethyl]-3-amino-3-methyl-1-butyne was cyclized to give N-ethyl - 3,3 - dimethyl - 2-methylene-6(4-methoxyphenyl) morpholine, and this compound was hydrogenated to yield 4 - ethyl-2,3,3-trimethyl-6(4-methoxyphenyl)morpholine, which distilled at about 110° C. at a pressure of about 0.01 mm. of Hg; $n_D^{25}=1.518$. The hydrochloride salt melted at 165–167° C.

*Analysis.*—Calc.: C, 64.09; H, 8.74. Found: C, 63.87; H, 8.68.

N-ethyl-N-[2-hydroxy - 2 - (4-tolyl)ethyl]-3-amino-3-methyl-1-butyne was cyclized to give 4-ethyl-3,3-dimethyl-2-methylene-6-(4-tolyl)morpholine, and the compound was hydrogenated to yield 4-ethyl-2,3,3-trimethyl-6-(4-tolyl)morpholine, which distilled in the range 94–98° C. at a pressure of about 0.4 mm. of Hg; $n_D^{25}=1.411$. The hydrochloride salt melted at 180–182° C.

*Analysis.*—Calc.: C, 67.70; H, 9.23. Found: C. 67.54; H, 9.05.

N-methyl-N-(2-hydroxy - 2 - phenylethyl)-3-amino-methyl-1-butyne was cyclized to give 3,3,4-trimethyl-2-methylene-6-phenylmorpholine, which compound was hydrogenated to yield 2,2,3,4-tetramethyl-5-phenylmorpholine distilling at about 95° C. at a pressure of about 0.04 mm. of Hg; $n_D^{25}=1.517$. The hydrochloride salt melted at about 181–183° C.

*Analysis.*—Calc.: C, 65.74; H, 8.62. Found: C, 65.70; H, 8.92.

3-(2-hydroxy-2-phenylethylamino) - 3-methyl-1-butyne was cyclized to yield 3,3-dimethyl-2-methylene-6-phenyl-morpholine, which distilled in the range 95–96° C. at a pressure of about 0.8 mm. of Hg. The compound was hydrogenated to give 2,3,3-trimethyl-6-phenylmorpholine, which distilled in the range 66–67° C. at a pressure of 0.04 mm. of Hg; $n_D^{25}=1.520$. The hydrochloride salt melted at 243–246° C.

*Analysis.*—Calc.: C, 64.58; H, 8.34. Found: C, 64.59; H, 8.18.

EXAMPLE 6

*Preparation of 4-(2-methoxyphenyl)-2,3,3-trimethylmorpholine*

Following the procedure of Example 1, N-(2-methoxyphenyl)-N-(2-hydroxyethyl)-3-amino-3-methyl - 1-butyne was cyclized in refluxing toluene in the presence of potassium hydroxide to yield 4-(2-methoxyphenyl)-3,3-dimethyl-2-methylenemorpholine. The compound was hydrogenated over a palladium-on-carbon catalyst to form 4-(2-methoxyphenyl)-2,3,3-trimethylmorpholine, which was isolated as the free base. The free base was then converted to the hydrochloride salt, which melted at about 177–178° C. after recrystallization from a methyl ethyl ketone-acetone solvent mixture.

*Analysis.*—Calc.: C, 62.87; H, 8.16. Found: C, 62.95; H, 7.95.

Following the same procedure, N-(4-tolyl)-N-(2-hydroxyethyl)-3-amino-3-methyl-1-butyne was cyclized to yield 4-(4-tolyl)-3,3-dimethyl - 2 - methylenemorpholine, which distilled at about 84° C. at a pressure of about 0.05 mm. of Hg; $n_D^{25}=1.539$. The methylenemorpholine was hydrogenated to form 4-(4-tolyl)-2,3,3-trimethylmorpholine, which distilled at about 84° C. at a pressure of about 0.03 mm. of Hg. The distillate solidified upon standing, and the resulting solid melted at about 40–42° C. The corresponding hydrochloride salt melted at about 154–156° C.

*Analysis.*—Calc.: C, 65.74; H, 8.67. Found: C, 65.95; H, 8.70.

Following the same procedure, N-(4-methyl-3-chlorophenyl)-N-(2-hydroxyethyl)-3-amino-3-methyl - 1-butyne was also cyclized to yield 4-(4-methyl-3-chlorophenyl)-3,3-dimethyl-2-methylenemorpholine, which was purified by distillation and distilled at about 110° C. at a pressure of about 0.08 mm. of Hg. The compound was hydrogenated to yield 4-(4-methyl-3-chlorophenyl)-2,3,3-trimethylmorpholine, which distilled in the range 100–102° C. at a pressure of about 0.08 mm. of Hg.

*Analysis.*—Calc.: C, 66.26; H, 7.94. Found: C, 66.55; H, 7.87.

EXAMPLE 7

*Preparation of 4-ethyl-2,3,3-trimethyl-3,4-dihydro-2H-1,4-benzoxazine*

A reaction mixture was prepared containing fifty-four grams of o-aminophenol, one gram of cuprous chloride, one gram of copper-bronze powder, and 1000 ml. of ether. Fifty-two grams of 3-chloro-3-methyl-1-butyne were added to the reaction mixture. One hundred and one grams of triethylamine were then added, and the resulting mixture was stirred at ambient room temperature for about 48 hours. 1000 ml. of water were added to the reaction mixture. The ether layer was separated and washed with two 500-ml. portions of water. The ether layer was dried and distilled. 4-ethyl-3,3-dimethyl-2-methylene-3,4-dihydro-2H-1,4-benzoxazine thus prepared distilled in the range 86–90° C. at a pressure of about 0.3 mm. of Hg. Redistillation of this fraction yielded purified 4-ethyl-3,3-dimethyl-2-methylene-3,4-dihydro-2H-1,4-benzoxazine, distilling at about 65° C. at a pressure of about 0.05 mm. of Hg.

Nineteen grams of 4-ethyl-3,3-dimethyl-2-methylene-3,4-dihydro-2H-1,4-benzoxazine were hydrogenated in ethanol solution using 5 percent palladium-on-carbon as a catalyst. The catalyst was separated by filtration and the filtrate was distilled, yielding 4-ethyl-2,3,3-trimethyl-3,4-dihydro-2H-1,4-benzoxazine, which boiled at about 70° C. at a pressure of about 0.2 mm. of Hg. The corresponding hydrochloride salt was prepared by the method of Example 1 and melted at about 190–192° C. after recrystallization from ethyl acetate.

*Analysis.*—Calc.: C, 61.82; H, 7.55. Found: C, 61.60; H, 7.77.

EXAMPLE 8

*Preparation of 4-(2-hydroxyethyl)-2,3,3-trimethylmorpholine*

Following the procedure of Example 1, 3-bis-(2-hydroxyethyl)amino-3-methyl-1-butyne was cyclized to yield 4-(2-hydroxyethyl)-3,3-dimethyl - 2 - methylenemorpholine. This compound was hydrogenated by the procedure of Example 1 over a palladium-on-carbon catalyst to yield 4-(2-hydroxethyl)-2,3,3-trimethylmorpholine distilling in the range 90–95° C. at a pressure of about 0.04 mm. of Hg. The hydrochloride salt melted at 68–70° C.

*Analysis.*—Calc.: C, 51.59; H, 9.61. Found: C, 51.39; H, 9.54.

EXAMPLE 9

*Preparation of 2,2,3-trimethylpiperazine*

A reaction mixture was prepared containing four hundred and twenty-four grams of 85 percent aqueous ethylenediamine, one gram of cuprous chloride, one gram of copper-bronze powder, and 400 ml. of water. The reaction mixture was chilled to about 0° C. Two hundred and two grams of 3-chloro-3-methyl-1-butyne were added in dropwise fashion. After the addition had been completed, the reaction mixture was stirred for about 48 hours at ambient room temperature. An additional 500 ml.

of water were added and the reaction mixture was contacted with 1000 ml. of ether in order to extract 3,3-dimethyl-2-methylenepiperazine formed in the above reaction. The ether extract was washed with 10 percent aqueous hydrochloric acid, thus causing the piperazine to isomerize to a tetrahydropyridazine, which passed into the aqueous acidic layer as a salt. The aqueous layer was separated and was made basic with 10 percent aqueous sodium hydroxide, thus forming 2,2,3-trimethyltetrahydropyridazine free base. The free base, being insoluble in the aqueous alkaline layer, separated and was extracted with ether. The ether extract was separated, dried, and distilled. 2,3,3-trimethyltetrahydropyridazine distilled at about 74° C. at a pressure of about 10 mm. of Hg.

Ten grams of 2,3,3-trimethyltetrahydropyridazine were dissolved in 200 ml. of ethanol. One gram of 5 percent palladium-on-carbon catalyst was added and the mixture was hydrogenated in a lower pressure hydrogenation apparatus at a hydrogen pressure of about 40 p.s.i. until the theoretical quantity of hydrogen had been absorbed. The catalyst was removed by filtration and 2,3,3-trimethylpiperazine, present in the filtrate, was converted to the dihydrochloride salt by passing gaseous anhydrous hydrogen chloride into the ethanolic filtrate. The solvent and excess hydrogen chloride were removed by evaporation in vacuo, leaving as a residue 2,3,3-trimethylpiperazine dihydrochloride, which melted at about 129–130° C. after recrystallization from isopropyl alcohol.

*Analysis.*—Calc.: C, 41.80; H, 9.52. Found: C, 41.82; H, 9.49.

EXAMPLE 10

*Preparation of 1,4-diethyl-2,2,3-trimethylpiperazine*

A reaction mixture was prepared containing fifteen grams of 18 M sulfuric acid, one gram of mercuric oxide, and 20 ml. each of water and methanol. Eleven grams of N-ethyl-N-(2-ethylaminoethyl)-3-amino-3-methyl-1-butyne were added to the reaction mixture in dropwise fashion. The reaction mixture was heated to refluxing temperature for about 4 hours. 1,4-diethyl-3,3-dimethyl-2-methylenepiperazine formed in the above reaction was isolated by the procedure of Example 7 and was purified by distillation.

1,4-diethyl-3,3-dimethyl-2-methylenepiperazine was hydrogenated by the procedure of Example 9 to yield 1,4-diethyl-2,3,3-trimethylpiperazine. The catalyst was separated by filtration and the filtrate was acidified with gaseous hydrogen chloride, thus forming 1,4-dimethyl-2,3,3-trimethylpiperazine dihydrochloride. The ethanol and excess hydrogen chloride were removed by evaporation in vacuo and the residue, comprising the dihydrochloride salt, was dissolved in water. The water solution was made basic with 40 percent (w./v.) sodium hydroxide, thus forming 1,4-diethyl-2,3,3-trimethylpiperazine free base which, being insoluble in the alkaline layer, separated and was extracted into ether. The ether layer was separated, dried and distilled. 1,4-diethyl-2,3,3-trimethylpiperazine distilled at about 1000° C. at a pressure of about 20 mm. of Hg. The dihydrochloride salt was made by the procedure of Example 1 and melted at about 240–241° C. after recrystallization from isopropyl alcohol.

*Analysis.*—Calc.: C, 51.35; H, 10.19. Found: C, 51.20; H, 9.87.

EXAMPLE 11

*Preparation of 4-ethyl-1-(3-chloro-4-methylphenyl)-2,3,3-trimethylpiperazine*

Fifty grams of N-ethyl-N-(2-chloroethyl)-3-amino-3-methyl-1-butyne were dissolved in 200 ml. of acetonitrile. Fifty grams of 3-chloro-4-methylaniline were added, and the reaction mixture was heated to refluxing temperature over night. The solvent was removed in vacuo, leaving as a residue N-ethyl-N-[2-(3-chloro-4-methylphenylamino)ethyl]-3-amino-3-methyl-1-butyne hydrochloride. The residue was dissolved in a minimal amount of water and the resulting solution was made alkaline by the addition of a 40 percent (w./v.) solution of aqueous sodium hydroxide. N-ethyl-N-[2-(3-chloro-4-methylphenylamino)ethyl]-3-amino-3-methyl-1-butyne free base was insoluble in the alkaline layer and separated. The free base was extracted with four 100-ml. portions of ether. The ether layers were separated, combined, dried and distilled. N-ethyl-N-[2-(3-chloro-4-methylphenylamino)ethyl]-3-amino-3-methyl-1-butyne boiled at about 150° C. at a pressure of about 0.1 mm. of Hg.

Twenty grams of N-ethyl-N-[2-(3-chloro-4-methylphenylamino)ethyl]-3-amino-3-methyl-1-butyne were added in dropwise fashion to a mixture containing two grams of mercuric oxide, 20 ml. of methanol, one hundred grams of 18 M sulfuric acid, and one hundred grams of water. The reaction mixture was heated to refluxing temperature. About one hour after the start of the dropwise addition of the aminoacetylene, an additional gram of mercuric oxide was added. After all of the amine had been added, the reaction mixture was refluxed for an additional four hours and was then stirred at ambient room temperature for about sixteen hours. The reaction mixture was made basic by the addition of 40 percent (w./v.) aqueous sodium hydroxide. 4-ethyl-3,3-dimethyl-2-methylene-1-(3-chloro-4-methylphenyl)piperazine formed in the above reaction was insoluble in the alkaline layer and separated. The compound was extracted into ether and the ether extract was separated, dried and distilled. 4-ethyl-3,3-dimethyl-2-methylene-1-(3-chloro-4-methylphenyl)piperazine distilled at about 200° C. at a pressure of about 2 mm. of Hg.

*Analysis.*—Calc.: C, 68.91; H, 8.31; N, 10.05. Found: C, 68.60; H, 8.51; N, 9.84.

4-ethyl-3,3-dimethyl-2-methylene-1-(3-chloro-4-methylphenyl)piperazine was hydrogenated by the method of Example 9 to yield 4-ethyl-3,3-trimethyl-1-(3-chloro-4-methylphenyl)piperazine dihydrochloride melting at about 192–193° C.

EXAMPLE 12

*Preparation of 4-ethyl-2,3-dimethyl-3-phenylmorpholine*

Following the procedure of Example 1, N-ethyl-N-(2-hydroxyethyl)-3-amino-3-phenyl-1-butyne was cyclized to yield 4-ethyl-3-phenyl-3-methyl-2-methylenemorpholine which distilled in the range 78–80° C. at a pressure of about 0.03 mm. of Hg; $n_D^{25}=1.533$.

Five grams of 4-ethyl-3-methyl-3-phenyl-2-methylenemorpholine were hydrogenated by the procedure of Example 1 to yield 4-ethyl-2,3-dimethyl-3-phenylmorpholine which distilled at about 67° C. at a pressure of about 0.03 mm. of Hg; $n_D^{25}=1.517$.

*Analysis.*—Calc.: C, 76.66; H, 9.65. Found C, 76.51; H, 9.71.

EXAMPLE 13

*Preparation of 4-ethyl-3,3-dimethyl-2-methylene 6-phenoxymethylmorpholine*

Sixty-six grams of 3-ethylamino-3-methyl-1-butyne were dissolved in 150 ml. of methanol. The solution was brought to refluxing temperature and 1000 grams of phenyl glycidyl ether were added. The reaction mixture was heated to refluxing temperature with stirring for about 48 hours, and was then distilled. N-ethyl-N-(2-hydroxy-3-phenoxypropyl)-3-amino-3-methyl-1-butyne, thus prepared distilled at about 135° C. at a pressure of about 1.0 mm. of Hg; $n_D^{25}=1.515$.

*Analysis.*—Calc.: C, 73.53; H, 8.87; N, 51.36. Found: C, 73.58; H, 8.77; N, 5.19.

Fifty grams of N-ethyl-N-(2-hydroxy-3-phenoxypropyl)-3-amino-3-methyl-1-butyne were added to ten grams of finely ground potassium hydroxide suspended in 200 ml. of refluxing xylene. Refluxing was continued for two hours after the addition had been completed. The reaction mixture was then filtered and the filtrate distilled. 4 - ethyl - 3,3 - dimethyl - 2-methylene-6-phenoxymethyl-morpholine thus prepared boiled in the range 110–112° C. at a pressure of about 0.05 mm. of Hg; $n_D^{25}=$ 1.519. The hydrochloride salt melted at 169–170° C.

*Analysis.*—Calc.: N, 4.43. Found: N, 4.32.

The starting materials which are useful in the processes and compositions of this invention are synthesized by the following methods. In general, the acetylenic amines having hydroxy or amino groups attached to the aminoacetylene by means of an ethylenic bridge are prepared by reacting a primary or secondary aminoacetylene with an ethylene oxide or a β-chlorethylamine. Where the amino group is part of an aromatic nucleus, these compounds are prepared by reacting an ortho-substituted aniline or other aromatic amine with a chloroacetylene using a copper catalyst. Methods of synthesis of these primary and secondary aminoacetylenes are described in the co-pending application of Nelson R. Easton and Robert D. Dillard, Serial No. 138,585, filed September 18, 1961, and in articles by Hennion and Teach, J. Am. Chem. Soc., 75, 1653 (1953), and Hennion and Nelson, J. Am. Chem. Soc., 79, 2142 (1957).

The following preparations will illustrate the general synthetic methods set forth in the above references.

PREPARATION 1

*3-(2-hydroxyethyl)amino-3-methyl - 1 - butyne.*—Seventy-five and nine tenths grams of sodium and two grams of ferric chloride were added to 2.5 liters of liquid ammonia, thus forming sodamide. Three hundred and three grams of 3-chloro-3-methyl-1-butyne were added to the sodamine solution in dropwise fashion. After the addition had been completed, 1 liter of ether was added and the reaction mixture was stirred at ambient room temperature for about fourteen hours, during which time all of the liquid ammonia evaporated. The ether solution was washed with water and was dried, and the ether was removed by distillation at atmospheric pressure, leaving as a residue 3-amino-3-methyl-1-butyne formed in the above reaction. The residue was distilled and 3-amino-3-methyl-1-butyne was recovered, boiling in the range 75–80° C. at atmospheric pressure.

Sixty grams of 3-amino-3-methyl-1-butyne were mixed wtih thirty-two grams of ethylene oxide and 700 ml. of methanol. The mixture was heated at about 70° C. in an autoclave for fourteen hours, and was then cooled. The reaction mixture was made acidic by the addition of 12 N hydrochloric acid. The solvents were removed by evaporation in vacuo and the residue, containing 3-(2-hydroxyethyl)amino-3-methyl-1-butyne hydrochloride was dissolved in water. The aqueous solution was made basic by the addition of 40 percent (w./v.) aqueous sodium hydroxide. 3-(2-hydroxyethyl)amino-3-methyl-1-butyne, being insoluble in the alkaline layer, separated and was extracted into ether. The ether extract was separated, dried, and the ether removed by evaporation in vacuo. Distillation of the residue yielded 3-(2-hydroxyethyl)amino-3-methyl-1-butyne distilling at about 132–135° C.; $n_D^{25}=1.481$. The hydrochloride salt was prepared by dissolving the free base in ether and saturating the ether solution with anhydrous gaseous hydrogen chloride. The hydrochloride salt was isolated by filtration and recrystallized from a mixture of methyl ethyl ketone and ethyl acetate. 3-(2-hydroxyethyl)amino-3-methyl-1-butyne hydrochloride thus prepared melted at about 82–84° C.

*Analysis.*—Calc.: C, 52.04; H, 8.74. Found: C, 52.18; H, 8.85.

PREPARATION 2

*N-(4-methyl-3-chlorophenyl) - N -(2-hydroxyethyl)-3-amino-3-methyl-1-butyne.*—A mixture containing ninety-four grams of 3-chloro-4-methylaniline, one gram of ferric chloride, and five hundred grams of triethylamine was heated to refluxing temperature. One hundred grams of 3-chloro-3-methyl-1-butyne were added in dropwise fashion to the refluxing mixture. The reaction mixture was heated for an additional hour at refluxing temperature and then was allowed to stand at ambient room temperatures for another fourteen hours. One hundred milliliters each of water and ether were added. The ether layer, containing 3-(4-methyl - 3 - chloroanilino)-3-methyl - 1 - butyne formed in the above reaction, was separated and the ether removed by evaporation in vacuo. The residue containing the aminoacetylene was dissolved in 12 N hydrochloric acid. The acidic solution was extracted once with ether and the ether extract was discarded. The acidic layer was then made basic with 40 percent (w./v.) aqueous sodium hydroxide. 3-(3 - chloro-4-methylamino)-3-methyl-1-butyne was insoluble in the alkaline solution and separated. The separated free base was extracted into ether and the ether layer was separated and dried. The ether was removed by evaporation in vacuo. Distillation of the residue yielded 3-(3-chloro-4-methylanilino)-3-methyl-1-butyne which boiled at about 126° C. at a pressure of about 5 mm. of Hg.

Following the procedure of Preparation 1, 3-(3-chloro-4-methyl-3-anilino)-3-methyl-1-butyne was reacted with ethylene oxide in methanolic solution in a autoclave, thus forming N-(4-methyl-3-chlorophenyl)-N-(2-hydroxyethyl)-3-amino-3-methyl-1-butyne which was isolated and purified by the procedure set forth in Preparation 1. N-(4-methyl-3-chlorophenyl) - N - (2-hydroxyethyl)-3-amino-3-methyl-1-butyne distilled at about 120° C. at a pressure of about 2 mm. of Hg. The hydrochloride salt melted at 116–117° C.

*Analysis.*—Calc.: C, 58.34; H, 6.64; N, 4.86. Found: C, 58.58; H, 6.56; N, 4.86.

PREPARATION 3

*N-ethyl-N-(2 - hydroxyethyl) - 3 - amino - 3 - methyl-1-chloro-1-butyne.*—Twenty-five and four tenths grams of sodium and two grams of ferric chloride were added to 500 ml. of liquid ammonia, thus forming a sodamide suspension in liquid ammonia. A solution containing one hundred and eleven grams of 3-ethylamino-3-methyl-1-butyne dissolved in 300 ml. of ether was added to the sodamide suspension in dropwise fashion over a 4-hour period. One liter of ether was added and the reaction mixture was heated to refluxing temperature for about one hour, during which time all of the ammonia evaporated. Next, a solution containing two hundred and ten grams of p-toluene-sulfonyl chloride in 500 ml. of ether was added in dropwise fashion to the reaction mixture. The resulting mixture was stirred at ambient room temperature for about fourteen hours. One liter of water was added. The aqueous layer was made acidic by the addition of 12 N hydrochloric acid and the ether layer was separated and discarded. The aqueous acidic layer was made basic by the addition of 40 percent (w./v.) sodium hydroxide. 3-ethylamino-3-methyl-1-chloro-1-butyne formed in the above reaction was insoluble in the basic layer and separated. The compound was extracted into ether, the ether layer was separated and dried, and the ether removed by evaporation in vacuo. Distillation of the residue yielded 3-ethylamino-3-methyl-1-chloro-1-butyne distilling in the range 66–68° C. at a pressure of about 40 mm. of Hg.

Following the procedure of Preparation 1, forty grams of 3-ethylamino-3-methyl-1-chloro-1-butyne were mixed with thirteen and two tenths grams of ethylene oxide in 300 ml. of ethanol. The reaction mixture was heated at about 70° C. in an autoclave for about fourteen hours. N-ethyl-N-(2 - hydroxyethyl)-3-amino-3-methyl-1-chloro-1-butyne thus formed was isolated and purified by the method of Preparation 1. N-ethyl-N-(2-hydroxyethyl)-3-amino-3-methyl-1-chloro-1-butyne thus prepared distilled at about 90° C. at a pressure of about 4 mm. of Hg.

We claim:
1. A compound selected from the group consisting of the amine bases of the formula:

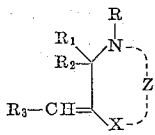

wherein
R is a member of the group consisting of hydrogen and $C_1$–$C_{12}$ hydrocarbyl;
$R_1$ and $R_2$, when taken separately, are $C_1$–$C_{12}$ hydrocarbyl, free from acetylenic unsaturation;
$R_1$ and $R_2$, when taken together with the carbon atom to which they are attached, form cyclic hydrocarbyl;
$R_3$ is a member of the group consisting of hydrogen and halo;
Z is a two-carbon linking group; and
X is a member of the group consisting of —O— and

and acid addition salts thereof.
2. The process of synthesizing a compound of the following formula:

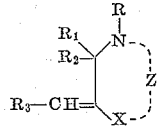

wherein
R is a member of the group consisting of hydrogen and $C_1$–$C_{12}$ hydrocarbyl;
$R_1$ and $R_2$, when taken separately, are $C_1$–$C_{12}$ hydrocarbyl, free from acetylenic unsaturation;
$R_1$ and $R_2$, when taken together with the carbon atom to which they are attached, form cyclic hydrocarbyl;
$R_3$ is a member of the group consisting of hydrogen and halo;
Z is a two-carbon linking group; and
X is a member of the group consisting of —O— and

which comprises heating in the presence of base in an inert anhydrous solvent a compound of the following formula:

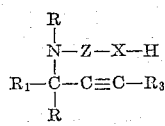

wherein R, $R_1$, $R_2$, $R_3$, Z, and X have the same meaning as hereinabove.

References Cited by the Examiner
UNITED STATES PATENTS

| | | | |
|---|---|---|---|
| 2,213,469 | 9/40 | Leffler | 260—247 |
| 2,374,181 | 4/45 | Dickey et al. | 260—244 |
| 2,375,628 | 5/45 | D'Alelio et al. | 260—247 |
| 2,381,935 | 8/45 | Strain et al. | 260—244 |

FOREIGN PATENTS 869,129    5/61   Great Britain.

OTHER REFERENCES

McElvain et al.; Jour. Am. Chem. Soc., vol. 76, pp. 1126–27 (1954).

WALTER A. MODANCE, *Primary Examiner.*
NICHOLAS S. RIZZO, *Examiner.*